J. W. Maloy,
Polishing Marble.

No. 59,916. Patented Nov. 20, 1866.

Witnesses
H. C. Bunch
Wm. G. Hale

Inventor
J. W. Maloy by
J. H. Adams
atty.

United States Patent Office.

IMPROVED MACHINE FOR POLISHING MARBLE.

JAMES W. MALOY, OF BOSTON, MASSACHUSETTS.

Letters Patent No. 59,916, dated November 20, 1866.

SPECIFICATION.

Be it known that I, JAMES W. MALOY, of Boston, in the county of Suffolk, and State of Massachusetts, have invented a new and useful improvement in Machines for Polishing Marble, of which the following is a full, clear, and exact description. reference being had to the accompanying drawings. making part of this specification, in which—

Figure 1:
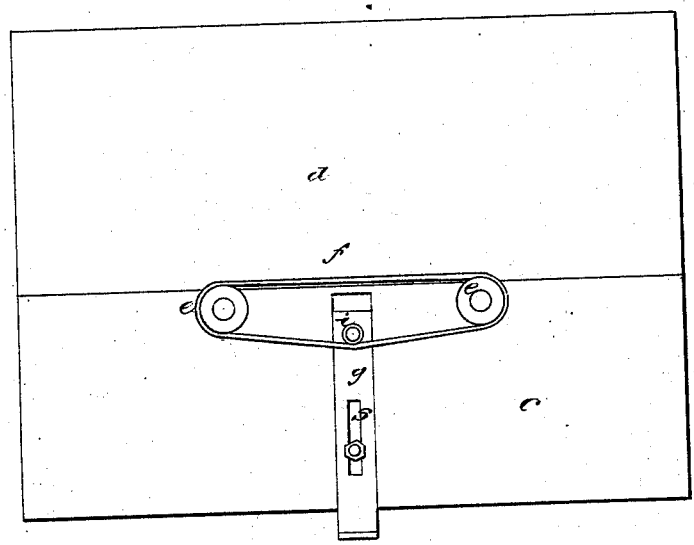
Figure 2:
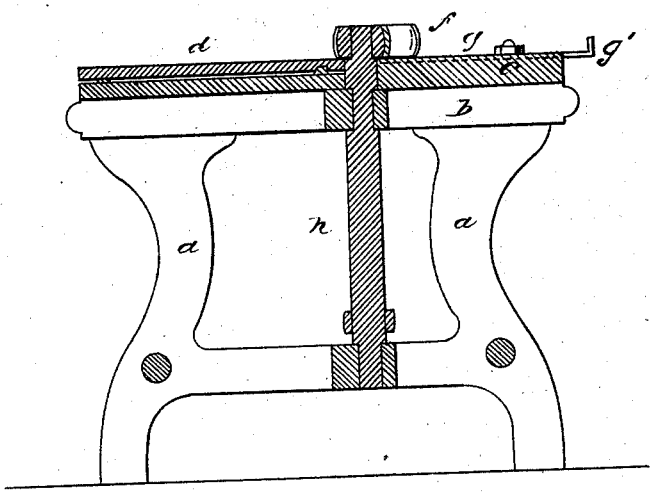

Figure 1 represents a plan view, and
Figure 2 a transverse section of my machine.

The object of my invention is to polish the mouldings or curved edges of a slab of marble, and the invention consists in the employment of an endless band of felt, or other suitable material, arranged upon two rollers or disks attached to the upper ends of shafts, which latter are rotated in any convenient manner. Referring to the drawings, $a$, $b$, $c$, $d$ represent the frame and upper part of a table of a similar construction to that for which a patent has been granted to me. The part $d$ is a sliding platform of even surface with the fixed part $c$, and moves on ways or guides longitudinally. Near the inner edge of the stationary portion, $c$, of the table are arranged two rollers or pulleys, $e$, at any suitable distance apart and secured to the upper ends of vertical shafts $h$, which extends downward, their lower ends being properly supported or stepped in a cross-piece in the lower part of the frame. Upon the rollers or pulleys, $e$ $e$, is placed an endless band of felt, or other suitable material, $f$, against which, while in motion, is placed the piece of marble to be polished. The endless band, $f$, is kept tightened by means of a slide, $g$, placed at right angles to the said band, the latter passing over a pin or projection, $i$, on the slide. The slide is provided with a slot, and is held in position by a set-screw passing through the said slot. The marble to be polished is placed upon the sliding portion, $d$, of the table, and its edge is held against the endless band, $f$, which is put in motion by the rotation of the shafts $h$, and when placed against the portion of the band immediately on one of the rollers admits of the corners or curved edges of the marble being effectually acted upon.

I claim as new, and desire to secure by Letters Patent—

1. Polishing marble by means of an endless band of felting, or other suitable material, arranged and operating as described.

2. I claim the combination of an endless band, as described, with the sliding platform $d$, substantially as and for the purpose described.

In testimony whereof I have signed my name to this specification, in the presence of two subscribing witnesses.

JAMES W. MALOY.

Witnesses:
J. H. ADAMS,
JNO. D. PATTEN.